United States Patent
Schmidl et al.

(10) Patent No.: US 8,038,556 B2
(45) Date of Patent: Oct. 18, 2011

(54) TENSIONING DEVICE FOR A TRACTION MECHANISM, PARTICULARLY A BELT OR A CHAIN

(75) Inventors: Matthias Schmidl, Eckental (DE); Stefan Mack, Erlangen (DE); Rainer Pflug, Heilsbronn (DE)

(73) Assignee: Schaeffler Technologies GmbH & Co. KG, Herzogenaurach (DE)

( * ) Notice: Subject to any disclaimer, the term of this patent is extended or adjusted under 35 U.S.C. 154(b) by 480 days.

(21) Appl. No.: 12/374,718

(22) PCT Filed: Aug. 7, 2007

(86) PCT No.: PCT/EP2007/058171
§ 371 (c)(1),
(2), (4) Date: Jan. 22, 2009

(87) PCT Pub. No.: WO2008/022913
PCT Pub. Date: Feb. 28, 2008

(65) Prior Publication Data
US 2010/0022340 A1      Jan. 28, 2010

(30) Foreign Application Priority Data
Aug. 24, 2006   (DE) .......................... 10 2006 039 743

(51) Int. Cl.
*F16H 7/12* (2006.01)
(52) U.S. Cl. ...................................... 474/135
(58) Field of Classification Search .................. 474/109, 474/111, 133, 135, 136, 138, 140
See application file for complete search history.

(56) References Cited

U.S. PATENT DOCUMENTS

| | | | |
|---|---|---|---|
| 4,764,157 A | 8/1988 | Brandenstein et al. | |
| 4,983,144 A * | 1/1991 | Ojima | 474/111 |
| 5,004,448 A * | 4/1991 | Ojima | 474/111 |
| 5,035,680 A * | 7/1991 | Ojima | 474/138 |
| 5,037,357 A * | 8/1991 | Ojima | 474/111 |
| 6,422,964 B1 | 7/2002 | Rointru et al. | |
| 2004/0067805 A1 | 4/2004 | Hellmich et al. | |
| 2006/0229151 A1* | 10/2006 | Jansen et al. | 474/117 |
| 2009/0215564 A1* | 8/2009 | Pflug et al. | 474/135 |
| 2010/0273591 A1* | 10/2010 | Graf et al. | 474/138 |

FOREIGN PATENT DOCUMENTS

| | | |
|---|---|---|
| DE | 3717125 | 11/1987 |
| DE | 3942382 | 7/1990 |

(Continued)

*Primary Examiner* — William E Dondero
(74) *Attorney, Agent, or Firm* — Volpe And Koenig, P.C.

(57) ABSTRACT

A tensioning device for a traction mechanism, particularly a belt or a chain, including a tensioning lever over which the traction mechanism is guided and on which a tensioning spring is disposed with one end thereof, the other end thereof being provided on a spring holder by which the tensioning device can be fastened to an external object. A holding pin (11) extends through the tensioning spring (4), with the pin at one end (11) thereof being disposed in a fixed position on the tensioning lever (2) and at the other end thereof having a locking section (22) disposed on a locking element (17) provided on a spring holder (6). The locking element can be adjusted between a locking position of the holding pin end (16), in which the tensioning device (1) is fixed in a position with the pretensioned tensioning spring (4), and a released position of the holding pin end (16), in which the holding pin (10) is axially displaceable in the locking element (17), and limited by a stop.

8 Claims, 7 Drawing Sheets

FOREIGN PATENT DOCUMENTS

| | | |
|---|---|---|
| DE | 19501685 | 7/1996 |
| DE | 10312752 | 11/2004 |
| DE | 102004058770 | 6/2006 |
| WO | 2004099650 | 11/2004 |

* cited by examiner

TENSIONING DEVICE FOR A TRACTION MECHANISM, PARTICULARLY A BELT OR A CHAIN

BACKGROUND

The invention relates to a tensioning device for a traction mechanism, in particular, a belt or a chain, comprising a tensioning lever over which the traction mechanism is guided and on which a tensioning spring is arranged with one of its ends, wherein its other end is arranged on a spring holder by which the tensioning device can be fastened to an external object.

One such tensioning device is known, for example, from DE 195 01 685 C1. So that the assembly of this tensioning device is simplified, the tensioning device described there has a connection element that can be set in tension in the form of a spring strip extending from the spring holder to the tensioning lever, wherein a tensioning spring is provided between both in a known way. With the lower end, the spring strip is fixed on the spring holder by a pin inserted into an insertion borehole. The spring strip passes through the tensioning spring in its interior and is guided through a spring support provided on the tensioning lever on which the tensioning spring is supported with its other end. At this position on the end of the spring strip, there is another pin passing through transversely whose end is rotated by 90° about the longitudinal axis of the strip, so that a stop is produced. In the assembled position, the upper pin is inserted and supported on the tensioning lever. Because the length of the spring strip is shorter than the length of the unloaded tensioning spring, this can be fixed in the pretensioned position due to the two-sided pin support of the spring strip.

Now if the tensioning device is installed, then the upper pin is removed, so that the tensioning spring can be unloaded. Then, in addition to the pretensioning function, limiting the movement of the tensioning spring path is added to the spring strip as a second function. This is because the tensioning spring can be unloaded only as much as the spring strip stop at the end permits. Namely, if this spring runs against the tensioning lever, then the spring path is limited.

A disadvantage in this configuration is that the sheet strip is relatively thin, so that it can break after multiple forceful load applications, that is, when the spring strip runs against the stop. In addition, a spring strip that is very unstable can vibrate during use, which might lead to the generation of noise.

SUMMARY

Thus, the invention is based on the objective of providing a tensioning device that allows the tensioning spring to be pretensioned, but that simultaneously also has a simple construction and functional transport and vibration protection.

For meeting this objective in a tensioning device of the type noted above, it is provided according to the invention that a holding pin passing through the tensioning spring is provided that is arranged with one end fixed in position on the tensioning lever and with the other end having a locking section on a locking element that is provided on the spring holder and that can be moved between a position locking the holding pin end in which the tensioning device can be fixed in a position with a pretensioned tensioning spring and a position releasing the holding pin end in which the holding pin can move in the axial direction in the locking element but is limited by a stop.

In the tensioning device according to the invention, reversible transport protection is provided that is distinguished initially by a stable holding pin that passes through the tensioning spring in the axial direction preferably in the middle of the spring. The holding pin is fixed at both ends, with one end on the tensioning lever and with the other on the spring holder in a locking element provided especially for this purpose. The locking element can move between two positions. In one position, the locking element interacts with the locking section of the holding pin end such that the tensioning device is locked with the pretensioned tensioning spring. Unloading of the tensioning spring is thus stopped by the locking of the holding pin in the locking element. If the locking element moves into the second open position, then the locking section is released on the holding pin end, so that the holding pin end or the locking section can move in the axial direction in the locking element; thus the tensioning device can exert its tensioning function with an alternating compressed and unloaded tensioning spring. Nevertheless, the holding pin movement in the locking element is limited by a stop, that is, the maximum spring path is limited by this stop against which the locking section of the holding pin end runs. In this way, vibration protection is realized that prevents the tensioning spring from being completely unloaded for the unintentional detachment of the pin locking, for example, before the belt or the like is placed over the tensioning lever during assembly, which is dangerous.

First, it is clear that reversible transport protection is given due to the adjustable arrangement of the locking element. After a first release of the holding pin, because this can be locked again in the position pretensioning the spring, all that is needed is to press the tensioning device against the tensioning spring and to bring the locking element back into the locking position, here interacting with the locking section of the holding pin. In addition, the vibration protection is also guaranteed as described. In connection with the use of a stable holding pin that has a diameter of several millimeters, an extremely stable transport and vibration protection system is realized. Breakage is excluded due to the stability of the pin. This pin also does not necessarily tend to vibrate—which is different than for strips—so that the generation of noise is also avoided despite the holding pin integrated permanently in the tensioning device.

The holding pin is preferably bent at least at the end arranged on the locking element for forming the locking section, thus it has a simple bend on the end by which the locking section can be constructed in a very simple way.

For the simplest possible handling, in an especially advantageous construction of the invention, the locking element is arranged so that it can rotate on the spring holder. The adjustment between the two positions, the locked and the released positions, is realized through simple rotation. The rotational axis advantageously lies in an extension of the tensioning spring axis that is constructed in a known way as a helical spring. The locking element itself is preferably a sleeve that preferably has a longitudinal opening in which a first stop is provided for the locking section in the locked position and a second stop limiting the movement path and arranged axially offset to the first section is provided for the locking section. The stops are here positioned so that they can naturally interact in each rotational position with the locking section that is fixed in position viewed in the radial direction. For example, a rotation by ca. 90° between the two positions of the locking element is conceivable. Accordingly, the stops are then also constructed offset by 90°. In the simplest case, the stops are constructed as support shoulders projecting inwardly in the radial direction.

Furthermore, on the locking element there can be twisting protection, in particular, in the form of a snap-in hook or the like, that interacts with the spring holder. In this way, undesired twisting of the locking element located in the released position is avoided. The holding pin itself can move in the locking element, in particular, the longitudinal opening of the sleeve, preferably in a guided way. That is, it has relatively little play, so that it cannot wiggle or bump against something. The locking element cannot rotate because this is not permitted by the guide. However, the rare case can appear (e.g., for strongly pretensioned springs) that the tensioning device is compressed so much during operation that the locking section is moved in the locking element so far downward that the locking element, here locking the holding pin in an undesired way, could be rotated in the locked position, which could lead, e.g., to vibrations or the like. Through the twisting protection, now the reverse rotation in the locked position is effectively prevented. An opposite rotation can be prevented, e.g., by a handling pin or the like still to be described below.

For simple adjustment of the locking element that is held in a corresponding support opening on the spring holder in the case of a rotating support, on the locking element there is preferably a section for a tool engagement, for example, for a screw wrench or the like. A manual handling section for rotation, however, is also conceivable, that is, a pin or the like projecting laterally or downward that can be engaged in the scope of the assembly.

As an alternative to the use of a rotating locking element, it is also conceivable to use a locking element arranged on the spring holder that has a first stop for the locking section in the locked position and a second stop arranged offset laterally and limiting the movement path for the locking section that is provided at the end of a longitudinal opening of the locking element. In this construction of the invention it is required to move the holding pin from the locked position in which it contacts the first stop somewhat to the side, which can be realized through corresponding movement of the tensioning lever, and to thread the holding pin with its locking section into the longitudinal opening on the locking element in which it is then guided during the operation-dependent movement and in which it can run, at a maximum, against the movement-limiting second stop. For inserting the holding pin with its end with the locking section, preferably a second longitudinal opening is provided by which the holding pin can be inserted into the locking element.

The holding pin end fastened to the tensioning lever preferably also has a locking section that is preferably also formed by a bend, that is, an angle of the holding pin end. This locking section can be arranged directly on the tensioning lever, for which a corresponding holder is provided in which it can be inserted. Alternatively, a holding element to be arranged on the tensioning lever can also be preferably used in which the holding pin is inserted with its locking section, that is, for example, the bend for which a corresponding plug-in holder is provided on the holding element. The holding element that is preferably inserted into a lever-side holder opening laterally can then be inserted into this opening from the side and held locked in rotation there. For fixing, the holding element can have a locking element, in particular, a snap-in hook that, in the assembled state, engages behind the tensioning lever or a holder edge or hooks onto the inner diameter of the spring. Furthermore, it is preferred when the holding element and the holder have an essentially dovetail-like construction in cross section. In connection with the snap-in hook, any movement of the holding element from the assembled position in the holder is prevented.

For forming the locking section, the holding pin end can be bent. This can be a simple angle of 90°, but a U-shaped bend is also conceivable, that is, another angle of also 90°. Thus, a kind of angled hook is formed on the end of the pin. This allows preassembly of the spring holder with the locking element, the tensioning spring, and the holding pin. This is because the spring can be held in the pretensioned position by the holding pin fixed on the locking element in the locked position and by the advantageously U-shaped section engaging over the tensioned spring at the free edge. Preferably, both ends of the holding pin are developed so that a Z-shaped holding pin is formed. This construction of the holding pin effectively stops buckling of the spring.

The holding element has a holder for the holding pin or the locking section. This holder can be constructed in the form of a blind hole in which the end of the holding pin or the locking section is inserted. The construction in which this holder is constructed as a clamping groove in which the locking section snaps in the assembled position is also preferred.

As an alternative to a clamping groove, a borehole in which the holding pin engages and is securely held is further suitable. For assembly with the tensioning lever, initially the holding pin is guided by the tensioning lever, while simultaneously the tensioning spring is strongly compressed. Then the holding element is inserted into the holder, after which the spring is unloaded and the locking section locks into the clamping groove, whereby movement of the holding pin is restricted.

BRIEF DESCRIPTION OF THE DRAWINGS

Additional advantages and details of the invention will be described below using embodiments with reference to the figures. The figures are schematic diagrams and show.

DETAILED DESCRIPTION OF THE PREFERRED EMBODIMENTS

Figure 1:
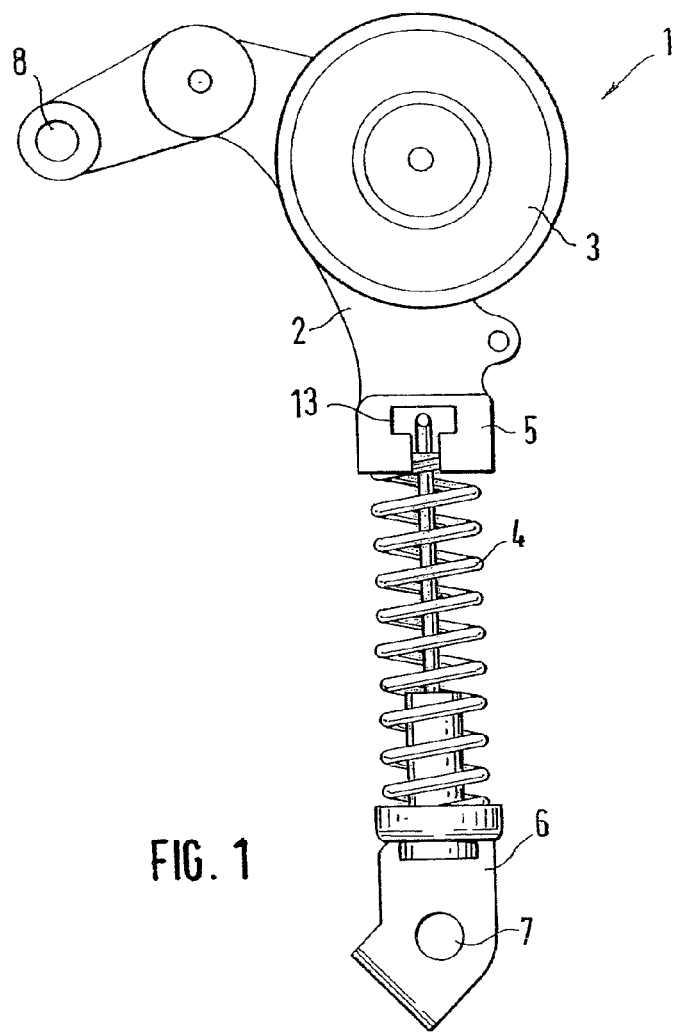
FIG. 1 a basic diagram of a tensioning device according to the invention.
Figure 2:
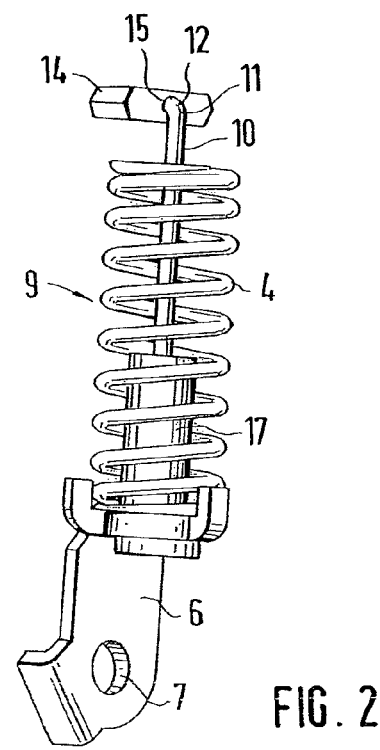
FIG. 2 a view of the transport and vibration protection of the tensioning device from FIG. 1, FIG. 3 a sectional view through the tensioning device from FIG. 1 in a partial view with released holding pin, FIG. 4 a sectional view according to FIG. 3 with locked holding pin, FIG. 5 a detailed view of the spring holder with inserted locking element from below, FIG. 6 a detailed perspective view of a tensioning device without tensioning lever with another embodiment of a holding element, FIG. 7 a view of the parts from FIG. 6 in the assembled position on the tensioning lever, FIG. 8 a further view of the tensioning device from FIG. 7, FIG. 9 a basic diagram of a tensioning device without tensioning lever and tensioning spring with another embodiment of a locking element with locked holding pin, FIG. 10 the arrangement from FIG. 9 with holding pin located in the working position, FIG. 11 a perspective view of the locking element from below, and FIG. 12 a perspective view of the spring holder with fixed locking element.

FIG. 1 shows a tensioning device 1 according to the invention comprising a tensioning lever 2 on which a tensioning roller 3 is arranged over which a traction mechanism, especially a belt, is guided in the assembled position. The tensioning device 1 further comprises a tensioning spring 4 that is here constructed as a helical spring and is supported with its end facing the tensioning lever 2 on a spring support 5 that is constructed on the tensioning lever 2. The other end of the tensioning spring 4 is supported on a spring holder 6. The spring holder 6 is fastened to an external object, for example, a motor vehicle engine or the like, for which the attachment borehole 7 is used. Accordingly, the tensioning lever 2 is also provided with an attachment borehole 8 with which it can be fastened rotatably to an external object.

Now, in order to be able to deliver and equip the tensioning device 1 with a pretensioned tensioning spring, it is necessary to lock the tensioning spring 4 in the compressed state. Here, a locking device 9 is provided comprising a holding pin 10 that is fixed on the spring support 5 with its top end 11 on which it has a locking section 12 in the form of a bend, that is, an angle. Here, the spring support 5 has a holder 13 that is open to the side and in which a holding element 14 can be inserted from the side. The holding element 14 has an insertion holder 15 in which the bent locking section 12, that is, the angled holding pin end, can be inserted.

Figure 3:
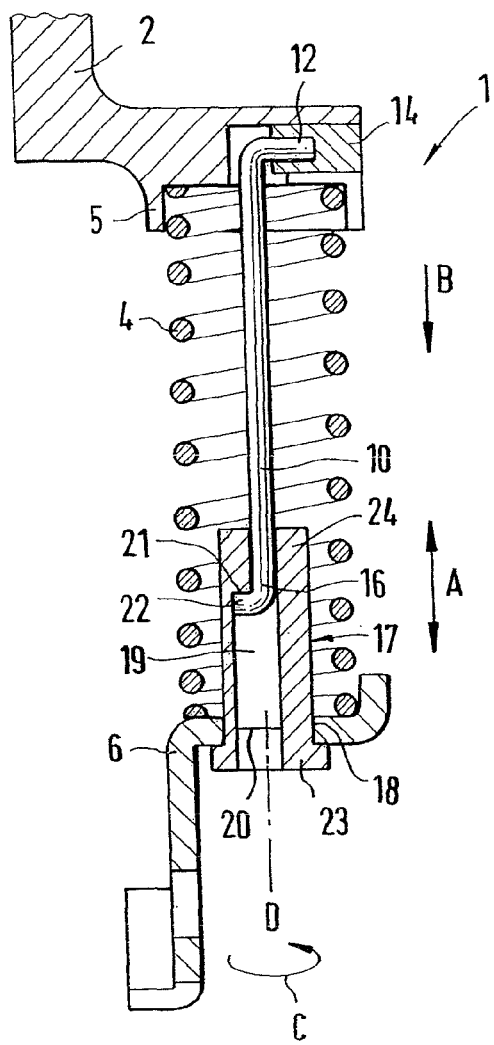

The holding pin 10 passes through the helical spring axially and centrally and is held with its lower holding pin end 16 in a locking element 17 that is held rotatably on the spring holder 6 in an opening 18, thus it can be rotated in this opening 18 about the rotational axis D (see FIG. 3). The rotational axis D extends as an extension of the longitudinal axis of the holding pin 10.

The locking element 17 is constructed as a sleeve 24 and has a longitudinal opening 19 in which two stops 20, 21 are constructed pointing inwardly in the radial direction. Both are used for locking or as stops for the locking section 22 of the holding pin end 16, wherein this locking section 22 is also realized here by a bend in the end of the pin.

FIG. 3 shows the tensioning device as a basic diagram in a partial view, wherein here the locking element 17 is located in a rotational position in which the lower stop 20 has released the locking section 22, so that the tensioning spring 4 can be unloaded and consequently the tensioning lever 2 is forced away from the spring section 6. Here, the holding pin 10 fixed on the tensioning lever 2 is moved in the axial direction. This axial movement, however, is limited by the stop 21 against which the locking section 22 of the holding pin 10 runs. Thus, vibration protection is realized, because in this way the maximum unloaded path of the tensioning spring 4 is limited.

In this position of the locking element 17, now the tensioning lever 10 can move in the axial direction with its locking section 22 in the longitudinal opening 19, as shown by the double-headed arrow A. Now, e.g., if a belt that is elongated or shortened while revolving during operation runs over the tensioning roller 3, then this change in position is transmitted continuously from the tensioning roller to the tensioning spring 4 that springs in and out continuously. In this way, the holding pin 10 moves axially with its locking section 22 as shown by the double-headed arrow A and is guided within the longitudinal opening 19. FIG. 3 shows the path-limited stop position. During operation, however, the locking section 22 is located somewhat underneath this stop position, so that it can finally oscillate freely, because this stop position that is provided only as protection for unintentional cracking, that is, explosion-like unloading of the tensioning spring 4, is typically not achieved during operation.

The width of the longitudinal opening in the region in which the holding section 22 is moved during the oscillating tensioning movement after assembly of the tensioning device 1 should be selected so that the holding pin end is guided with the smallest possible play in the longitudinal opening, in order to prevent bumping against something or a knocking noise. The holding element can also be formed from plastic or metal like the locking element 17.

Figure 4:
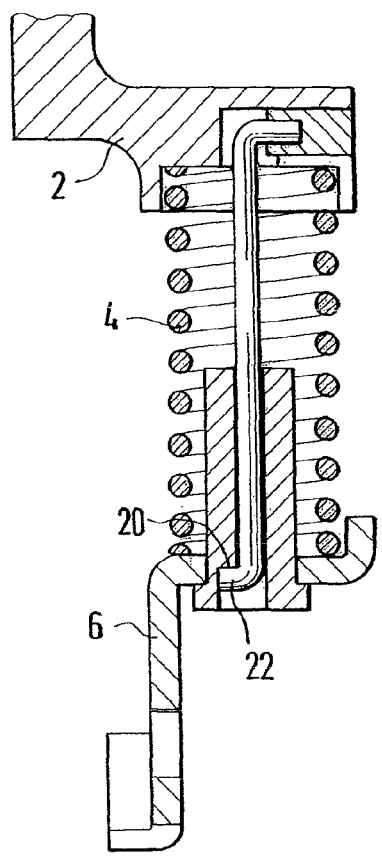

FIG. 4 shows a view according to FIG. 3, wherein here, however, the tensioning device 1 is shown in the transport-secured position with pretensioned tensioning spring 4. In the following example, to reach this transport position starting from the position according to FIG. 3, initially the tensioning spring 4 is to be compressed as shown by the arrow B, that is, the tensioning lever 2 is to be pressed against the spring section 6. Here, the locking section 22 moves downwardly in the longitudinal opening. It is compressed in length or width until the locking section 22 is underneath the lower stop 20. Then the locking element 17 is rotated about the rotational axis D, as shown by the arrow C. Here, the stop 20 is gripped by the locking section 22 that is fixed in position by its orientation also due to the fixing of the upper pin end in the orientation. Now, if it is unloaded, then the locking section 22 runs against the stop 20 rotated by it and is locked. The tensioning spring 4 can now not be further unloaded. The rotational movement for adjusting the locking element 17 between the two positions equals, for example, ca. 90°. For rotation, on the bottom end 23 of the locking element 17 there can be a suitable handling section that can be engaged by a tool or a handling section allowing manual engagement in the form of a pin or the like projecting laterally. It would also be conceivable to provide, e.g., an internal hexagonal socket or the like, for example, in the extension of the longitudinal opening 19.

Figure 5:
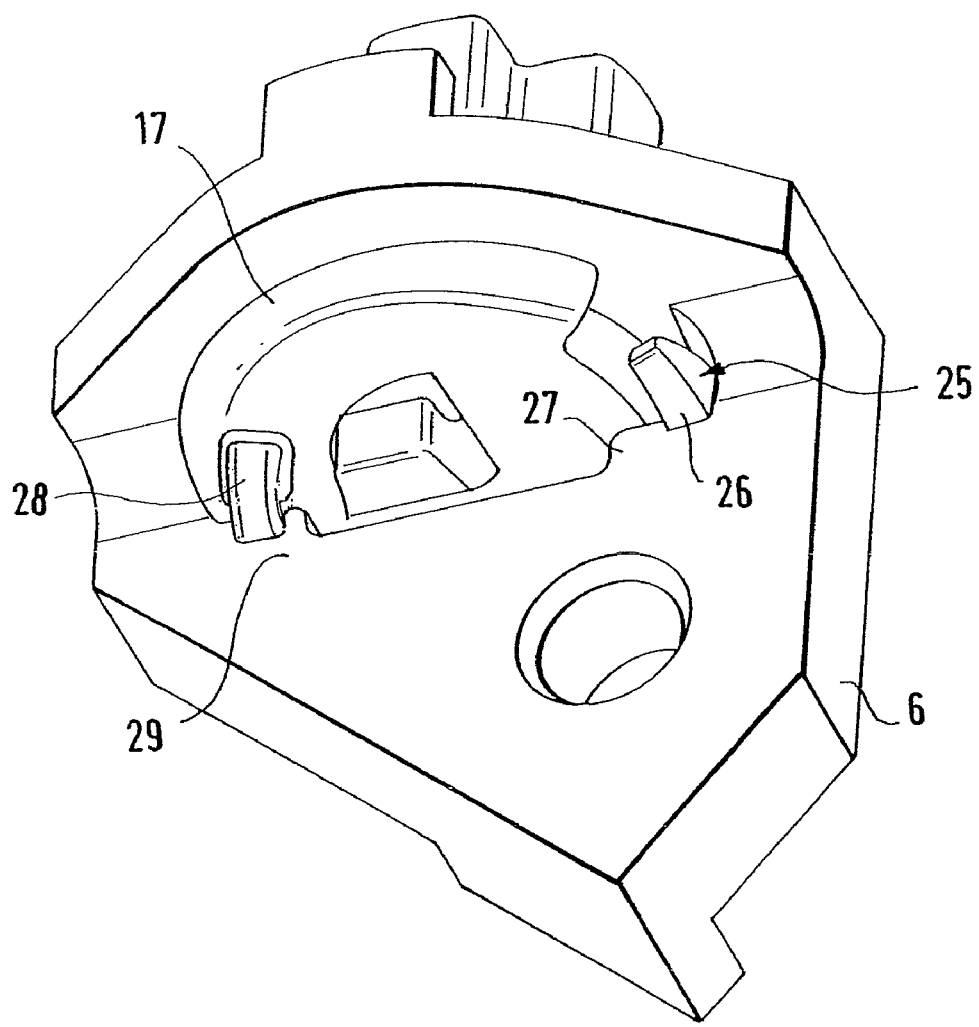

FIG. 5 shows a detailed view of the spring holder 6 with the applied locking element 17. The locking element 17 is shown in the released position in which the locking section 22 is released and consequently can move in the axial direction. In this position, the locking element 17 is secured from rotation. Here, the locking element 17 has twisting protection 25 in the form of a snap-in hook 26 that is shaped so that it can move on the locking element 17. In a rotation from the locked position into the released position, the snap-in hook 26 is moved at the same time. When the released position is assumed, the snap-in hook 26 engages behind the locking shoulder 27 on the spring holder 6. Reverse rotation, without which the snap-in hook 26 is actively pressed upward and is detached from the locked position, is not possible. Rotation in the other direction is prevented by the pin 28 shown here that projects upward and is used as a handling element for rotation of the locking element. This pin 28 impacts against the stop wall 29 of the spring holder 6.

Rotation of the locking element 17 is blocked in both directions. In this way it is guaranteed that the locking element is not inadvertently rotated back into the locked position. This is indeed excluded for typical operating conditions according to which the locking section 22 is guided on both sides in the longitudinal opening 19, consequently the locking section 22 of the rotationally locked holding pin 10 prevents reverse rotation. Under unfavorable conditions, for example, for very strongly pretensioned spiral springs, however, the holding pin 10 can move during operation up to the bottom side of the locking element 17. It would then assume a position in which it is underneath the stop 20, so that the locking element can be, in principle, rotated, which could happen in an undesired way due to corresponding vibrations or the like. This, however, would be prevented by the rotational protection.

Figure 6:
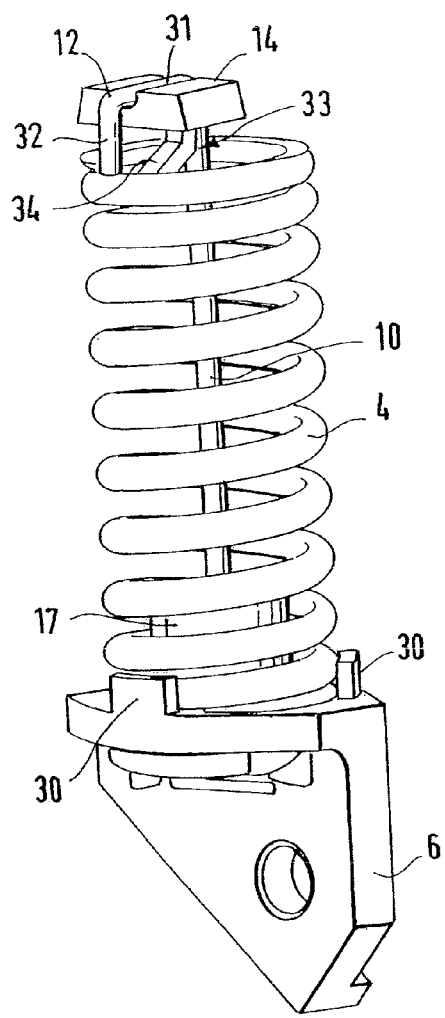

FIG. 6 shows a tensioning unit consisting of the spring holder 6 of the tensioning spring 4, the locking element 17, and the holding element 14. The holder of the spring 4 in the tensioning lever 2 and in the spring holder 6 is realized on the outer diameter of the spring 4 by segmented sections 30. This allows slight deformability of the components without cross slides in the aluminum diecasting method. Any transverse forces acting on the spiral spring 4 are absorbed in this way. Sideways movement of the spiral spring 4 is prevented. If the spring support 5 is constructed on the tensioning lever 2, see FIGS. 3 and 4, the tensioning spring 4 is also fixed there on the outer diameter.

In the construction shown in FIG. 6, the holding element 14 has a dovetail-like construction. Thus it has two lateral beveled faces. In a corresponding way that is nevertheless not shown in greater detail, the holder 13 on the tensioning lever also has a dovetail construction. In addition, the holding element 14 has on its top side a clamping groove 31 that is closed by more than 180°, so that the locking section 12 of the holding pin 10 can lock in the clamping groove 31 from above. The locking section 12 is here bent twice so that it has a U shape. The second angled section 32 extends essentially parallel to the longitudinal axis of the pin. Furthermore, on the holding element 14 there is a locking element 33 in the form of a snap-in hook 34. Using this snap-in hook 34, the holding element 14 is held in the tensioning lever 2. Together with the dovetail-shaped holder and the clamping groove 31 clamping the dovetail-shaped holding element 14 and the locking section 12, the tensioning hook 34 prevents movement of the holding pin 10 in the region of the tensioning lever 2.

Figure 7:
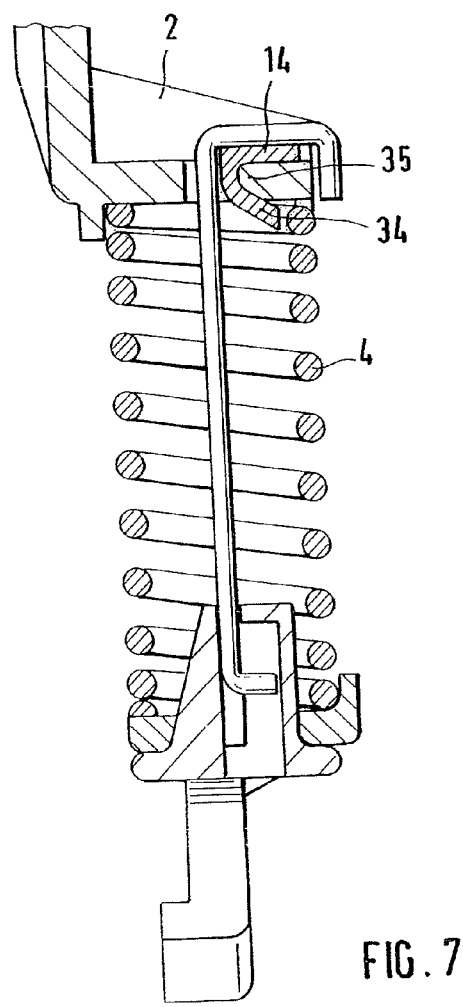
Figure 8:
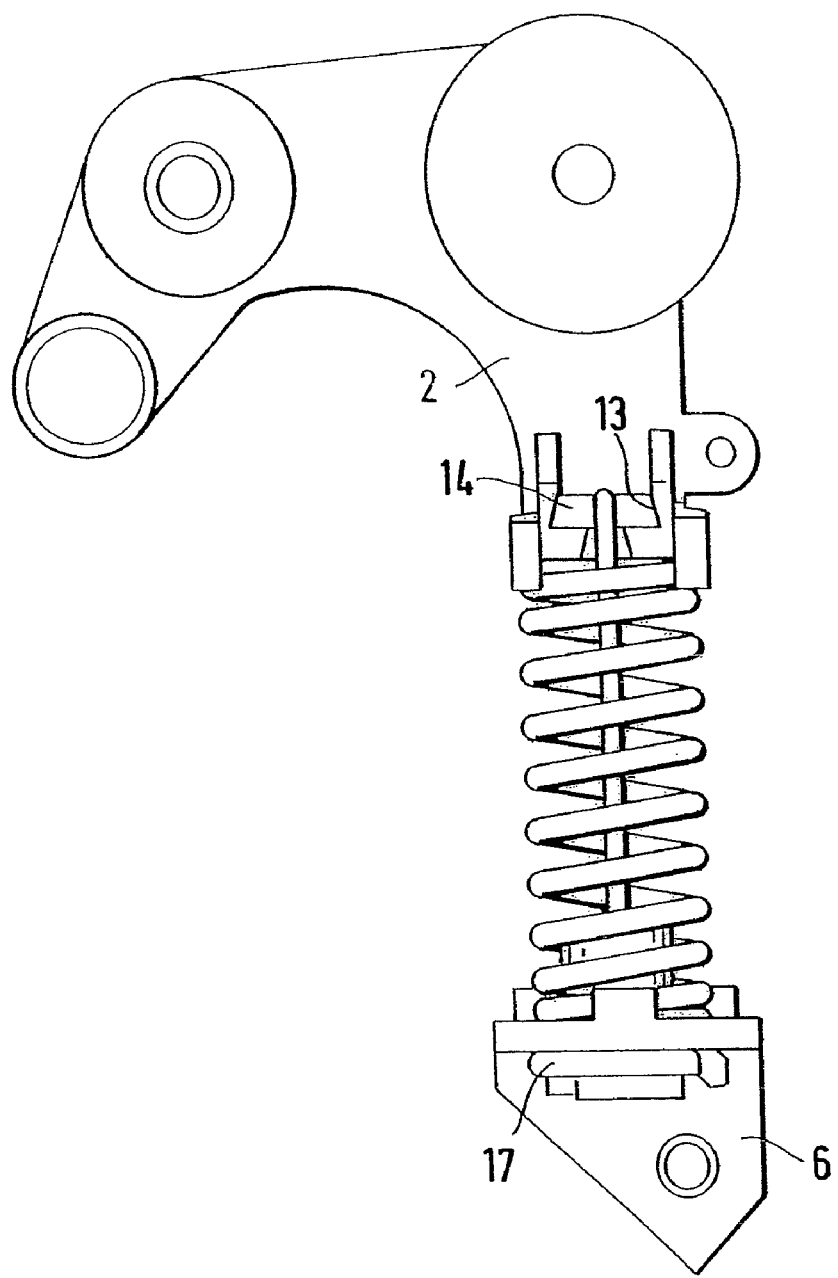

FIGS. 7 and 8 show the arrangement of the parts from FIG. 6 on the tensioning lever 2. The snap-in hook 34 clearly engages behind the lower edge 35 of the holder that is not shown in greater detail here and in which the holding element 14 on the tensioning lever 2 is inserted. The snap-in hook hooks on the inner diameter of the spiral spring 4.

For assembling the parts from FIG. 6, initially the upper locking section 12 is guided through the tensioning lever 2. The holding element 14 is not yet fastened to the locking section 12. The tensioning spring 4 is compressed so that the locking section 12 is spaced apart from the tensioning lever 2. Then the holding element 14 is pushed into the holder 13 until the snap-in hook 34 locks behind the holder edge 35. Then the tensioning spring 4 is unloaded, the locking section 12 moves downward and snaps into the clamping groove 31.

Starting from the diagram according to FIG. 6, it is also clear that preassembly of the spring holder 6, the locking element 17, and the tensioning spring 4 is possible without the holding element 14. The locking element is brought into the locking position in which it fixes the locking section 22 of the holding pin 10. In this case, the helical spring 4 can be unloaded until it impacts against the inside of the U-shaped, bent locking section. This engages over the topmost winding of the tensioning spring 4 and fixes this as a second stop in the pretensioned position.

Figure 9:
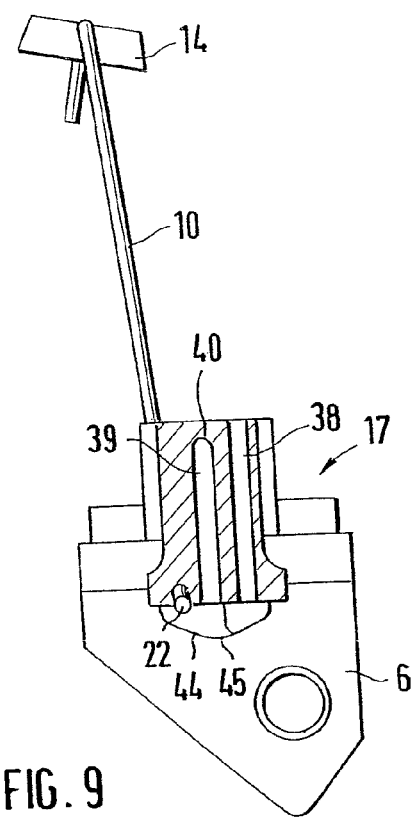
Figure 10:
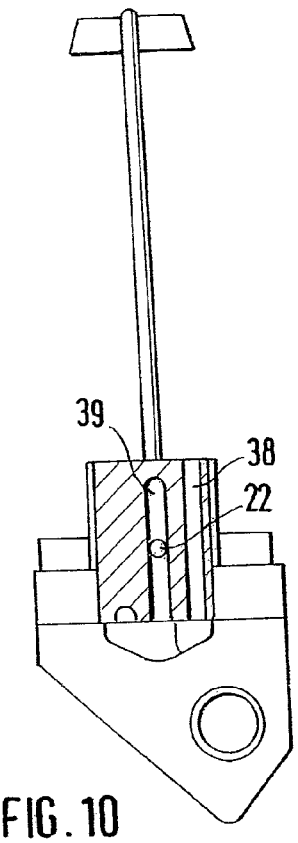
Figure 11:
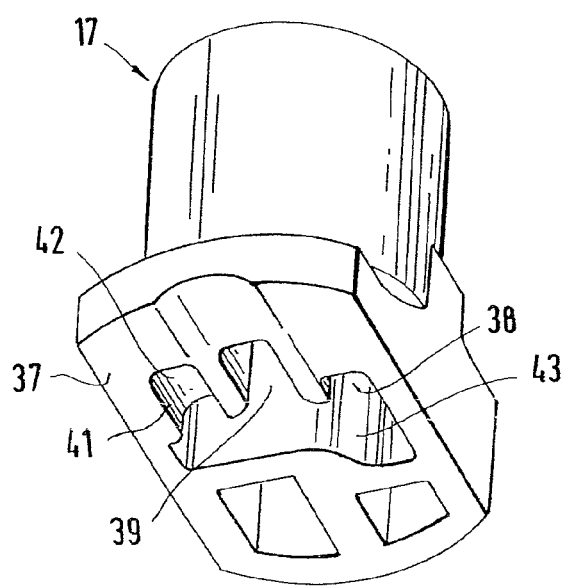
Figure 12:
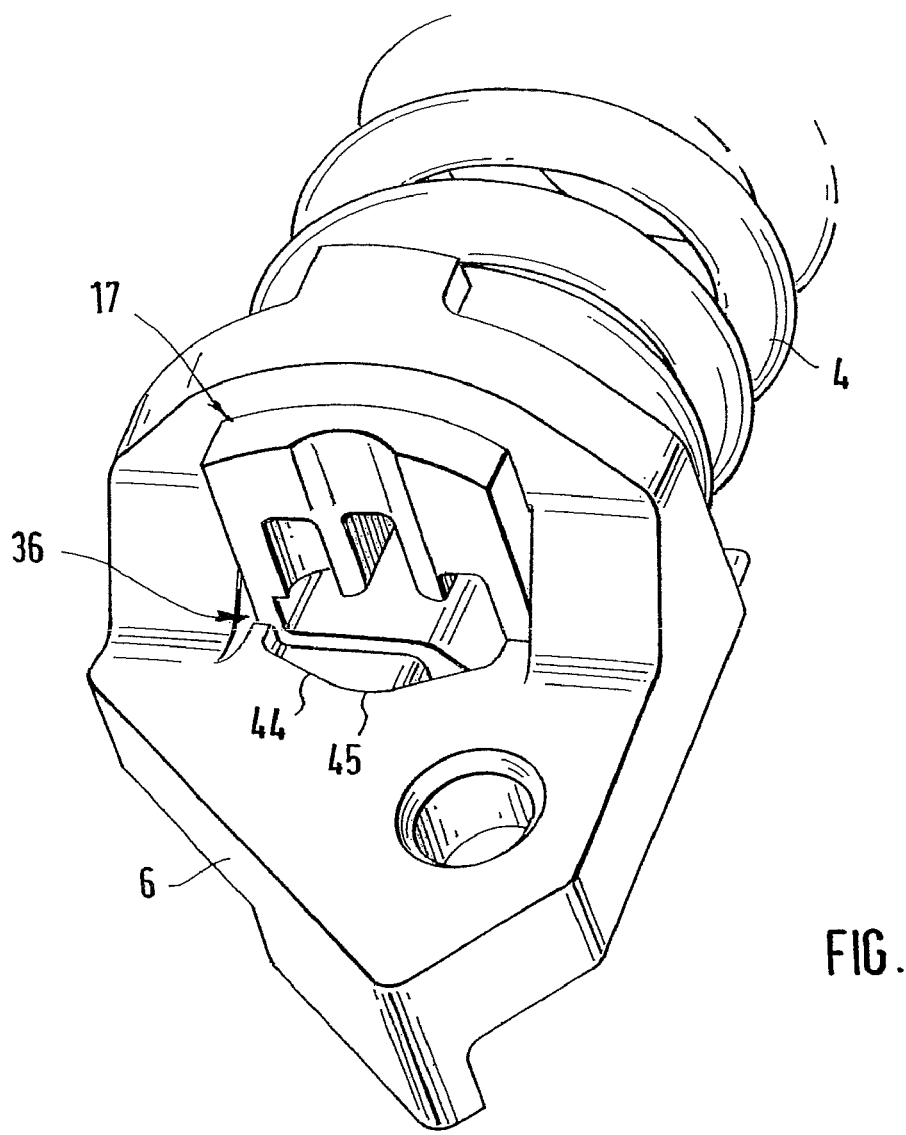

In the embodiment shown in FIG. 9, the locking element 17 is arranged stationary on the spring holder 6, which is different than in the construction described above, where it is supported rotatably. On the spring holder 6, see FIG. 12, there is a recess 36 in which the locking device 17 having an essentially rectangular floor 37 in the bottom view according to FIG. 11 engages from the side in a rotationally secured way. The locking device 17 has a first longitudinal opening 38 by which the holding pin 10 is inserted with its lower locking section 22 from above. To this longitudinal opening 38, another longitudinal opening 39 connects, at whose end there is a stop 40, as well as a depression 41 that connects the second stop 42. Through the use of a guide bevel 43, the holding pin 10 is to be guided from the longitudinal opening 38 into the region of the second longitudinal opening 39 or the depression 41.

In the locking position, the locking section 22 is locked in the depression 41 on the stop 42 at this position. The not-shown tensioning spring is fixed in the compressed state in the spring support of the tensioning lever due to the counter support of the holding element 14. Now, after installation of the tensioning device, if the holding pin 10 should come loose from its locked position, only the helical spring is compressed somewhat. The locking section 22 then runs against a guide bevel 44 on the spring holder 6 that automatically leads it downward. In the region underneath the longitudinal opening 40, there is a depression 45 in which the locking section 22 is guided by the bevel 44. If this is reached, further compression is no longer possible, because this is stopped by the holding pin 10. Now if the tensioning spring is unloaded again, the locking section 22 is automatically threaded into the longitudinal opening 39.

REFERENCE NUMBERS

1 Tensioning device
2 Tensioning lever
3 Tensioning roller
4 Tensioning spring
5 Spring support
6 Spring holder
7 Attachment borehole
8 Attachment borehole
9 Locking device
10 Holding pin
11 Upper end
12 Locking section
13 Open holder
14 Holding element
15 Insertion holder
16 Holding pin end
17 Locking element
18 Opening
19 Longitudinal opening
20 Stop
21 Stop
22 Locking section
23 Lower end
24 Sleeve
25 Rotational protection
26 Snap-in hook
27 Locking shoulder
28 Pin
29 Stop wall
30 Projections
31 Clamping groove
32 Section
33 Locking element
34 Snap-in hook
35 Edge
36 Recess
37 Floor
38 Longitudinal opening
39 Longitudinal opening
40 Stop
41 Depression
42 Stop
43 Guide bevel
44 Bevel
45 Depression
A Double-headed arrow
C Arrow
D Rotational axis

The invention claimed is:
1. Tensioning device for a traction mechanism, comprising a tensioning lever over which the traction mechanism is guided and on which a tensioning spring is arranged with a first end and having a second end that is arranged on a spring holder by which the tensioning device can be fastened to an external object, a holding pin passes through the tensioning spring and is arranged with a first end fixed in position on the tensioning lever and with a second end having a locking section that is engageable in a locking element that is provided on the spring holder, and the locking element is arranged fixed in position on the spring holder and a first stop for the locking section is provided for a locking position on the locking element and a second stop is arranged laterally offset and which limits a movement path for the locking section is provided on an end of a longitudinal opening in the locking element.

2. Tensioning device according to claim 1, wherein a second longitudinal opening is provided by which the holding pin can be inserted into the locking element.

3. Tensioning device according to claim 1, wherein the holding pin can move in a guided way in the locking element in the longitudinal opening.

4. Tensioning device according to claim 1, wherein the holding pin end fixed on the tensioning lever has a locking section that is fixed directly on the tensioning lever or a holding element arranged on the tensioning lever.

5. Tensioning device according to claim 4, wherein the holding element is inserted laterally into a lever-side holder opening.

6. Tensioning device according to claim 4, wherein the holding pin end is bent for forming the locking section.

7. Tensioning device according to claim 6, wherein the holding pin end is bent into a U shape.

8. Tensioning device according to claim 6, wherein a clamping groove in which the bent section of the holding pin end is held is provided on the holding element.

* * * * *